(12) United States Patent
Ishiguro et al.

(10) Patent No.: US 12,373,875 B2
(45) Date of Patent: *Jul. 29, 2025

(54) RECOMMENDATION DEVICE

(71) Applicant: TRYGLE CO., LTD., Chuo-ku (JP)

(72) Inventors: Takehiro Ishiguro, Tokyo (JP); Daisuke Nakamura, Tokyo (JP)

(73) Assignee: TRYGLE CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,119

(22) Filed: Nov. 22, 2022

(65) Prior Publication Data
US 2023/0153888 A1 May 18, 2023

Related U.S. Application Data

(63) Continuation of application No. 16/621,013, filed as application No. PCT/JP2017/026107 on Jul. 19, 2017, now Pat. No. 11,538,085.

(51) Int. Cl.
*G06Q 30/00* (2023.01)
*G06Q 30/0241* (2023.01)
(Continued)

(52) U.S. Cl.
CPC ..... *G06Q 30/0631* (2013.01); *G06Q 30/0255* (2013.01); *G06Q 30/0277* (2013.01)

(58) Field of Classification Search
CPC ........... G06Q 30/0631; G06Q 30/0255; G06Q 30/0277
See application file for complete search history.

(56) References Cited

U.S. PATENT DOCUMENTS

| 8,484,099 B1 | 7/2013 | Pope et al. |
| 10,318,543 B1 | 6/2019 | Sharifi |

(Continued)

FOREIGN PATENT DOCUMENTS

| CN | 102609523 A | 7/2012 |
| CN | 104137142 A | 11/2014 |

(Continued)

OTHER PUBLICATIONS

"Personalised Fuzzy Recommendation for High Involvement Products," Gerogiannis, Vassilis C.; Karageorgos, Anthony; Liwei Liu; Tjortjis, Christos. 2013 IEEE International Conference on Systems, Man, and Cybernetics (SMC 2013): 4884-90. IEEE Computer Society. (2013). Gooale. 8nas. (Year: 2013).*

(Continued)

*Primary Examiner* — Robert M Pond
(74) *Attorney, Agent, or Firm* — ALSTON & BIRD LLP

(57) ABSTRACT

A product selecting unit extracts a candidate for recommended product on the basis of browsing information in a browsing information storing unit and unpurchased product information in an unpurchased product information storing unit. Product specifications that are information specific to each product are stored in a product information storing unit. A specification correlation calculating unit extracts a product having a product specification correlated with a product specification of the candidate for recommended product on the basis of the product specifications, and extracts the product as a recommended product.

20 Claims, 4 Drawing Sheets

(51) Int. Cl.
  *G06Q 30/0251* (2023.01)
  *G06Q 30/0601* (2023.01)

(56) References Cited

U.S. PATENT DOCUMENTS

| | | | |
|---|---|---|---|
| 11,538,085 B2* | 12/2022 | Ishiguro | G06Q 30/0631 |
| 2005/0218217 A1 | 10/2005 | Hasegawa et al. | |
| 2006/0282304 A1 | 12/2006 | Kasavin et al. | |
| 2007/0124265 A1 | 5/2007 | Hebbani et al. | |
| 2009/0306935 A1* | 12/2009 | Hamilton, II | A63F 13/65 715/705 |
| 2012/0259687 A1 | 10/2012 | Kajamohideen et al. | |
| 2014/0156423 A1 | 6/2014 | Argue et al. | |
| 2015/0018979 A1 | 1/2015 | Tomii et al. | |
| 2015/0120386 A1 | 4/2015 | Sherman et al. | |
| 2015/0278906 A1 | 10/2015 | Navani et al. | |
| 2015/0339759 A1 | 11/2015 | Pope et al. | |
| 2016/0071187 A1 | 3/2016 | Bhosle et al. | |
| 2016/0260152 A1 | 9/2016 | Lagoni et al. | |
| 2017/0262815 A1 | 9/2017 | Shipman et al. | |
| 2018/0025364 A1 | 1/2018 | Nakaji | |
| 2018/0090146 A1 | 3/2018 | Sakanushi et al. | |
| 2019/0250206 A1 | 8/2019 | Noguchi et al. | |

FOREIGN PATENT DOCUMENTS

| | | |
|---|---|---|
| CN | 106709741 A | 5/2017 |
| EP | 2819069 A1 | 12/2014 |
| JP | 2002-123547 A | 4/2002 |
| JP | 2004-220152 A | 8/2004 |
| JP | 2004-348613 A | 12/2004 |
| JP | 2005-292909 A | 10/2005 |
| JP | 2006-176231 A | 7/2006 |
| JP | 2008-276449 A | 11/2008 |
| JP | 2014-029643 A | 2/2014 |
| JP | 2014-215772 A | 11/2014 |
| JP | 2015-191449 A | 11/2015 |
| KR | 10-2014-0111225 A | 9/2014 |
| WO | 2013/125128 A1 | 8/2013 |

OTHER PUBLICATIONS

"Personalised Fuzzy Recommendation for High Involvement Products," Gerogiannis, Vassilis C.; Karageorgos, Anthony; Liwei Liu; Tjortjis, Christos. 2013 IEEE International Conference on Systems, Man, and Cybernetics (SMC 2013): 4884-90. IEEE Computer Society. (2013), Google, 8 pgs, (Year: 2013).

German Office Action dated Oct. 31, 2020 for Application No. 11 2017 007652.8 with an English translation.

International Preliminary Report on Patentability received for PCT Patent Application No. PCT/JP2017/026107, mailed on Jan. 30, 2020, 13 pages (9 pages of English Translation and 4 pages of Original Document).

International Search Report and Written Opinion received for PCT Patent Application No. PCT/JP2017/026107, mailed on Aug. 15, 2017, 15 pages (8 pages of English Translation and 7 pages of Original Document).

English Translation of CN Office Action dated Mar. 28, 2023 for CN Application No. 201780093108, 9 page(s).

English translation of CN Search report Mailed on Mar. 28, 2023 for CN Application No. 201780093108, 3 page(s).

U.S. Appl. No. 16/621,013, filed Dec. 10, 2019, U.S. Pat. No. 11,538,085, Issued.

* cited by examiner

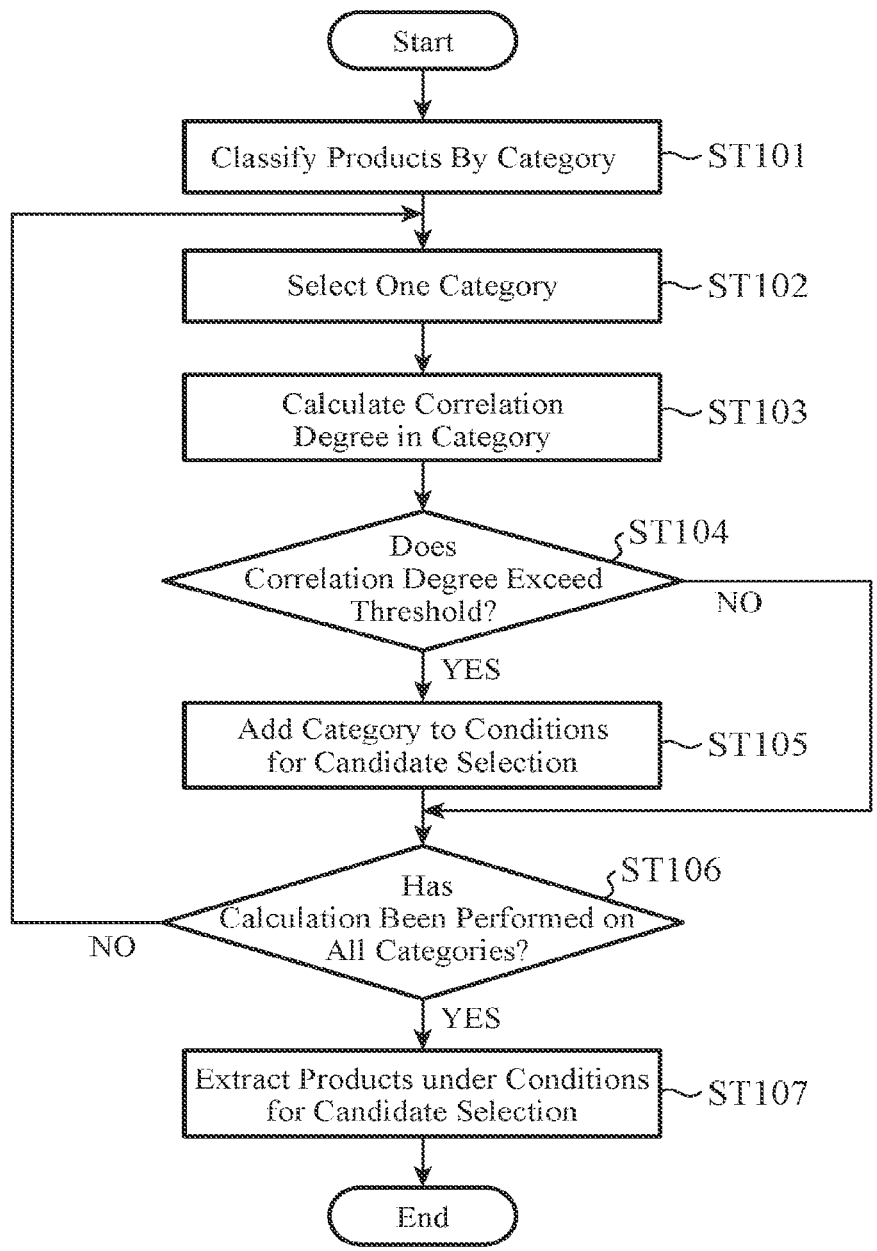

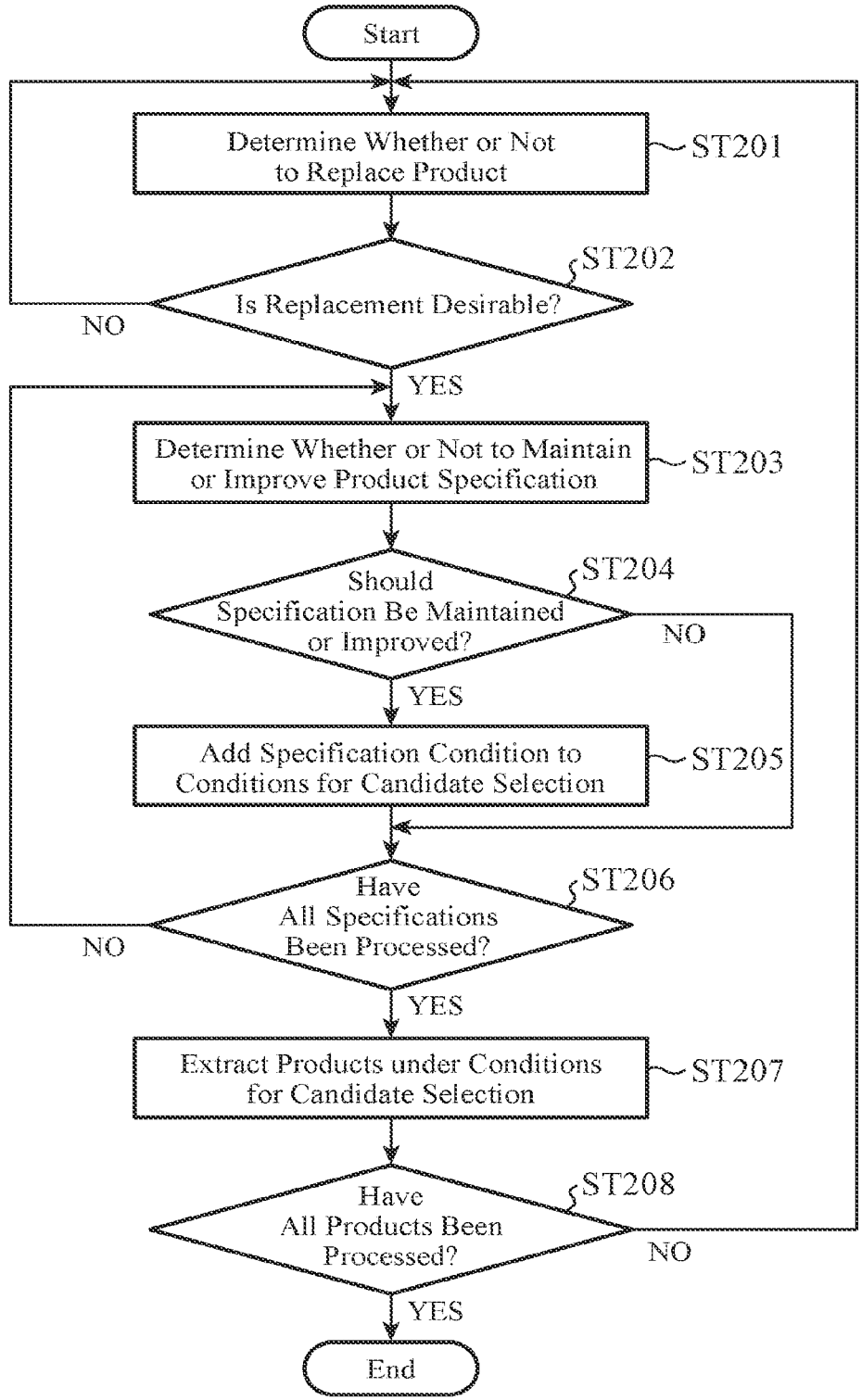

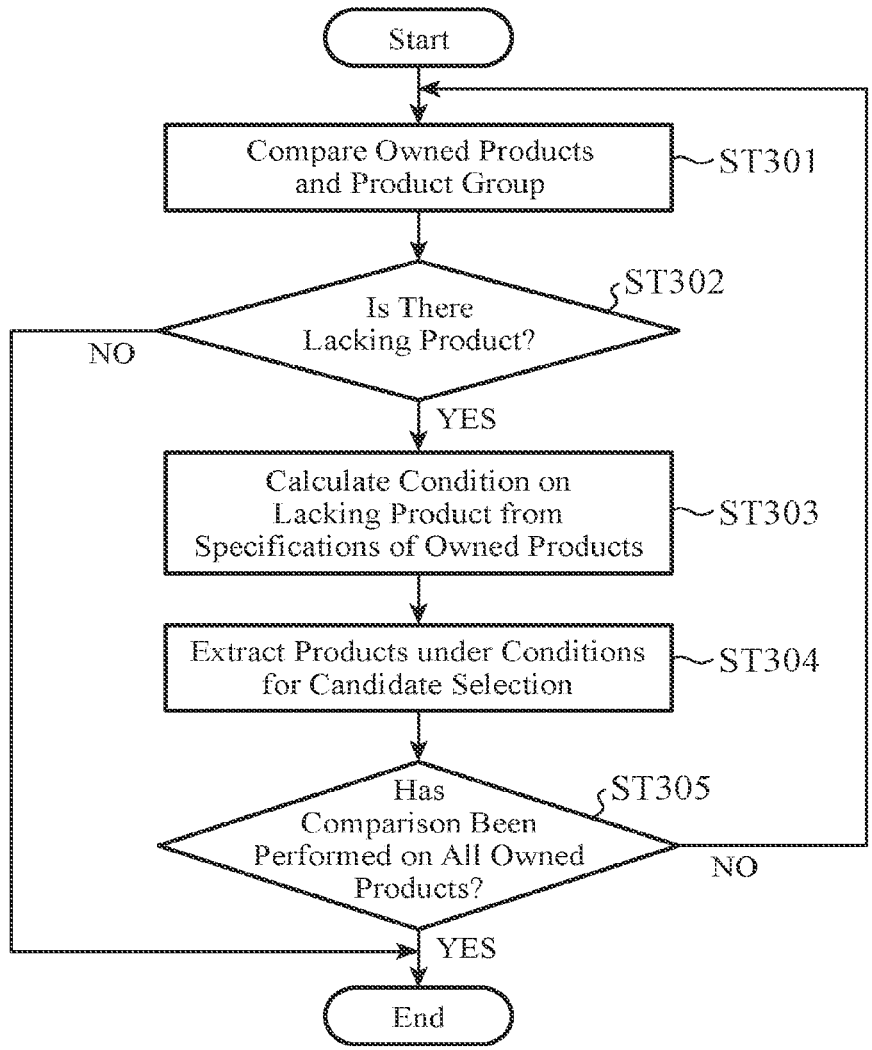

RECOMMENDATION DEVICE

CROSS REFERENCE TO RELATED APPLICATIONS

This application is a continuation of U.S. application Ser. No. 16/621,013, which was filed on filed Dec. 10, 2019 and entitled "RECOMMENDATION DEVICE", which is a National Phase Entry of PCT Application No. PCT/JP2017/026107, which was filed on Jul. 19, 2017 and entitled "RECOMMENDATION DEVICE". The entirety of each of the above-referenced applications is expressly incorporated herein by reference for all purposes.

TECHNICAL FIELD

The present disclosure relates to a recommendation device that selects advertisements to be displayed in accordance with circumstances, in order to display advertisements for either products that a user needs truly or products that are latently demanded as recommended products.

BACKGROUND ART

In order to display a product advertisement for a user of online shopping, a method of deriving a product advertisement to be displayed and its timing from the user's purchase information (including a history or schedule) and the characteristics of products is typically used as described in, for example, Patent Literature 1. In addition to this method, a method of determining a product advertisement to be displayed by referring to the purchase tendencies of other users having similar purchase information is also known well.

CITATION LIST

Patent Literature

Patent Literature 1: JP 2014-215772 A

SUMMARY OF INVENTION

Technical Problem

However, in a conventional device, only similarity is acquired for products falling within a wide range corresponding to each category. For example, advertisements for smart phones currently being sold are displayed for a customer who purchased a smart phone three years ago. Further, in a conventional device, only similarity is acquired within a narrow range such as brand names and model numbers. For example, for a customer who purchased a detergent one month ago, an advertisement for the same detergent is displayed, and since a certain customer purchased a product B together with a product A, an advertisement for B is displayed for another customer who purchased A.

Although these methods make it possible to select a very effective advertisement under suitable circumstances, a problem with the methods is that an unnecessary product advertisement is displayed with a high possibility for a customer who is choosing furniture or a household electrical appliance, which is usually purchased at long time intervals, or a customer who is choosing a product with a specific intention or taste. A problem is that a recommended product suitable for a target customer is not necessarily provided, for example, an advertisement for an inexpensive watch is displayed for a customer who is looking for a high-class watch, or an advertisement for a PC that is not intended for games is displayed for a customer who purchased a game-ready PC three years ago.

The present disclosure is made in order to solve the above-mentioned problems, and it is therefore an object of the present disclosure to provide a recommendation device that can improve the accuracy of extraction of a recommended product.

Solution to Problem

A recommendation device according to the present disclosure includes: processing circuitry to extract a candidate for recommended product that is to be presented to a target user on the basis of browsing information indicating information about the user's browsing of a product, and unpurchased product information indicating information about a product that the user has indicated an intention to purchase; and to extract a product having a product specification correlated with a product specification of the candidate for recommended product, and extract the extracted product as a recommended product.

Advantageous Effects of Invention

The recommendation device according to the present disclosure extracts a product having a product specification correlated with a product specification of a candidate for recommended product, and extracts this product as a recommended product. As a result, the accuracy of extraction of a recommended product can be improved.

BRIEF DESCRIPTION OF DRAWINGS

FIG. 3 is a flowchart showing the operation of the recommendation device of Embodiment 1 of the present disclosure;

FIG. 4 is a flowchart showing extraction of recommended products when replacement is performed in a recommendation device of Embodiment 2 of the present disclosure; and FIG. 5 is a flowchart showing extraction of recommended products when lacking products are added in the recommendation device of Embodiment 2 of the present disclosure.

DESCRIPTION OF EMBODIMENTS

Hereafter, in order to explain the present disclosure in greater detail, embodiments of the present disclosure will be described with reference to the accompanying drawings.

Embodiment 1

Figure 1:
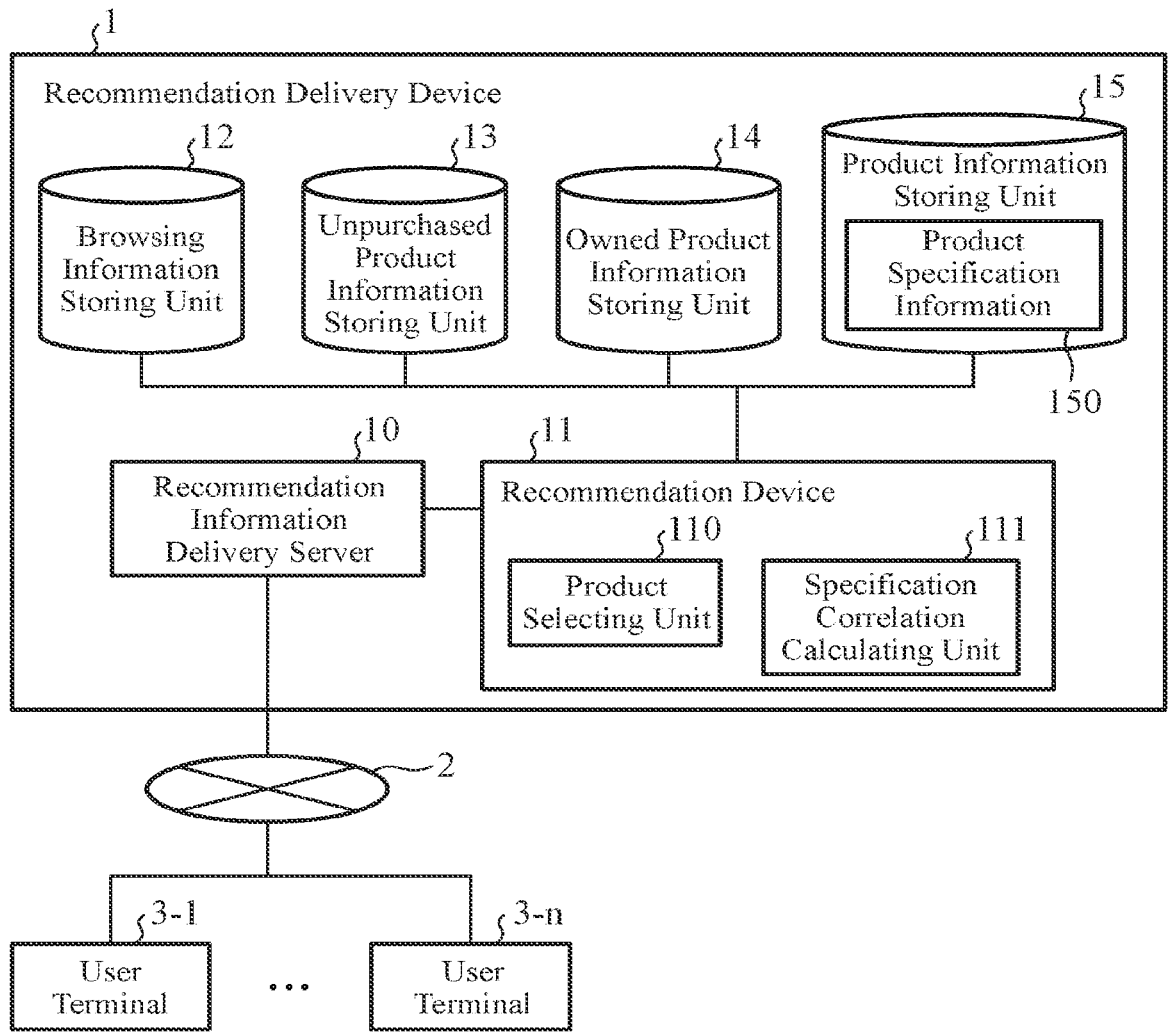
FIG. 1 is a block diagram showing a recommendation device of Embodiment 1 of the present disclosure.

FIG. 1 is a block diagram of a recommendation delivery system including a recommendation device according to this embodiment.

The illustrated recommendation delivery system includes a recommendation delivery device 1, a network 2, and user terminals 3-1 to 3-n. The recommendation delivery device 1 delivers advertisement information about products that users are demanding, to their respective user terminals 3-1 to 3-n via the network 2. In this configuration, one or more users receive information about recommended products suited to each of the users, such as product advertisements or news, via the network 2 like the Internet, from the recommendation delivery device 1, by using their respective user terminals 3-1 to 3-$n$ each having an input and output function, each of the user terminals being a PC, a smart phone, a TV, or the like. At this time, information about recommended products may be displayed together on part of a screen of a browser, an application, or the like that is caused to display by a user, or may be delivered in the form of an e-mail, a notification, or the like. Further, products mentioned here refer to what users can purchase and use, such as electric appliances, clothing, food products, furniture, travel tours, or concert tickets.

The recommendation delivery device 1 includes a recommendation information delivery server 10, a recommendation device 11, a browsing information storing unit 12, an unpurchased product information storing unit 13, an owned product information storing unit 14, and a product information storing unit 15. The recommendation information delivery server 10 delivers recommendation information extracted by the recommendation device 11 to the user terminals 3-1 to 3-$n$. The recommendation device 11 includes a product selecting unit 110 and a specification correlation calculating unit 111, and extracts recommended products. The product selecting unit 110 is a processing unit that extracts a candidate for recommended product to a target user on the basis of both browsing information in the browsing information storing unit 12 and unpurchased product information in the unpurchased product information storing unit 13. The specification correlation calculating unit 111 is a processing unit that extracts a product having a product specification correlated with a product specification of the candidate for recommended product, the candidate being extracted by the product selecting unit 110, by referring to product specification information 150 in the product information storing unit 15, and outputs the product as a recommended product.

The browsing information storing unit 12 is a storage unit that stores browsing information that is information about the type and contents of a Web page, an application screen, or a document such as PDF that has been caused to be displayed until now by a user. The unpurchased product information storing unit 13 is a storage unit that stores unpurchased product information that is information about a product that a user has indicated the user's intention to purchase, e.g., the user has paid attention to or has desired to purchase until now. In the unpurchased product information, unlike the browsing information, the user explicitly expresses information such as a fact that a product is not owned or an intention to purchase a product and the strength of the intention. As the simplest example of acquiring the unpurchased product information, there can be considered a method of allowing the user to select a product that the user is interested in or a product that the user desires to purchase from the product information hold by the recommendation delivery device 1. The owned product information storing unit 14 is a storage unit for storing owned product information that is information about a product that a user has purchased using online shopping or the like, or a product that the user owns. These browsing information, unpurchased product information, and owned product information may include information acquired from the outside of the recommendation delivery device 1, in addition information registered via the recommendation delivery device 1. As examples of information acquired from the outside, after a user's consent is acquired, the browsing information may be acquired from an external service such as a social networking service (SNS), a browser, or a search engine, and the unpurchased product information may be linked to a questionnaire survey that is performed by a third party, a wish list in a shopping site, or the like. Further, after a user's consent is acquired, the owned product information may be inferred from credit card statements of the user, contents that the user has written on the Internet, etc. When acquiring these pieces of information from the outside, the recommendation information delivery server 10 receives the pieces of information from the delivery sources of these pieces of information through the Internet. The product information storing unit 15 is a storage unit that stores pieces of product information that are classified by their categories, and has product specification information 150 as one type of the product information. The product specification information 150 may be any type of information as long as the product specification information shows information specific to a product, like the size, the specifications, the color, the weight, or a function of the product.

Next, the hardware configuration of the recommendation device 11 will be explained by referring to FIG. 2.

Figure 2:
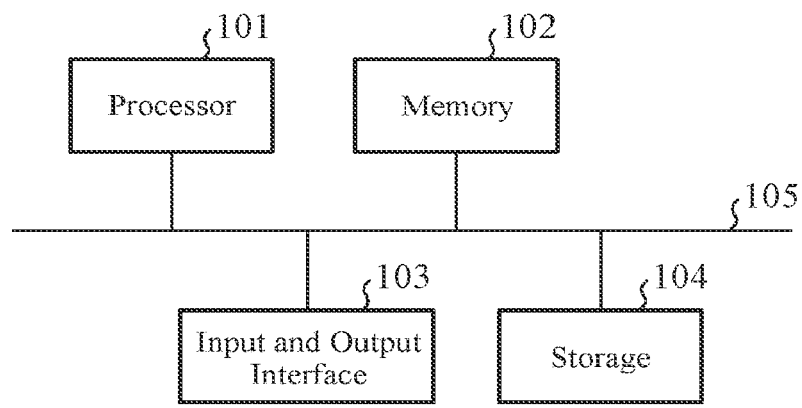
FIG. 2 is a hardware block diagram of the recommendation device of Embodiment 1 of the present disclosure.

The recommendation device 11 includes a processor 101, a memory 102, an input and output interface 103, a storage 104, and a bus 105, as shown in FIG. 2. The processor 101 implements the product selecting unit 110 and the specification correlation calculating unit 111 by executing programs corresponding to the functions of the product selecting unit 110 and the specification correlation calculating unit 111. The memory 102 is storage units, such as a ROM and a RAM, which are used as a program memory that stores various programs, a work memory that is used when the processor 101 performs data processing, a memory in which signal data is developed, and so on. The input and output interface 103 exchanges various types of signals with, for example, the browsing information storing unit 12, and the product information storing unit 15, and the recommendation information delivery server 10. Further, the storage 104 is a storage unit that stores a program corresponding to each of the functions of the product selecting unit 110 and the specification correlation calculating unit 111, and also stores various types of data. The bus 105 is a communication path for mutually connecting the processor 101, . . . , and the storage 104.

At least any one of the few product selecting unit 110 and the specification correlation calculating units 111 may be constituted by hardware for exclusive use.

Next, the operation of the recommendation device of Embodiment 1 will be explained.

First, the product selecting unit 110 extracts, as candidates for recommended products, products that a target user is latently interested in, by using the tendency of the user's previous actions that is based on browsing information in the browsing information storing unit 12, information about products that the user has expressed interest in, the information being indicated by unpurchased product information in the unpurchased product information storing unit 13, and information including purchase results or the likes based on owned product information in the owned product information storing unit 14. Further, as this extracting process, an analysis may be performed for a combination of the target user and another user. After extracting candidates for recommended products, the product selecting unit 110 outputs the candidates together with a message indicating that these products have not been purchased to the specification correlation calculating unit 111.

In the specification correlation calculating unit 111, recommended products are determined using product specification information 150 in the product information storing unit 15.

FIG. 3 is a flowchart showing the operation of the specification correlation calculating unit 111. When receiving the candidates for recommended products from the product selecting unit 110, the specification correlation calculating unit 111 classifies the candidates into categories, by their product genres, in terms of price, size, and function (step ST101). At this time, the category classifying may be performed by referring to product information in the product information storing unit 15. Next, the specification correlation calculating unit 111 calculates, as to the candidate products that have been classified into categories, the degree of correlation in product specifications between candidate products (step ST103) for each of the categories (step ST102), and determines whether the correlation degree exceeds a set threshold (step ST104). This is a process of calculating what degree of correlation two or more candidate products classified into the same category have with respect to their specifications, and finding out a category having a stronger correlation. Because it is expected that the category that has been determined to have a strong correlation (YES in step ST104) exhibits the user's taste, the category (condition) is added to conditions for candidate selection (step ST105). The specification correlation calculating unit 111 then determines whether the calculation has been performed on all the categories (step ST106), and, when determines that the calculation has not been performed on all the categories (NO in step ST106), the processing returns to step ST102 and the processes of steps ST102 to ST105 are repeated. In contrast, when, in step ST104, the correlation degree is equal to or less than the threshold (NO in step ST104), the processing just shifts to step ST106.

In a stage in which all conditions for candidate selection are completely provided (YES in step ST106), the specification correlation calculating unit 111, for example, narrows down the candidate products on the basis of the conditions for candidate selection in such a way that the conditions are satisfied, or adds, as a candidate product, another product satisfying the conditions on the basis of the product information in the product information storing unit 15, thereby extracting recommended products (step ST107).

Although the specification correlation calculating unit 111 extracts recommended products on the basis of the conditions for candidate selection as mentioned above, the conditions for candidate selection may be outputted to the product selecting unit 110, and the product selecting unit 110 may select recommended products each satisfying the conditions. Further, as a condition applied to the recommended products, hot-selling products, other users' evaluations, etc. may be referred to.

As mentioned above, in Embodiment 1, as the processing of the product selecting unit 110, products that a user needs explicitly or latently are selected on the basis of the user's actions, indication of the user's intention, etc., just as in conventional cases. Then, because on the basis of the specifications of the products selected by the product selecting unit 110, the specification correlation calculating unit 111 can perform the processing independently of apart in which the narrowing down or addition of a high-relevant product is performed, broad application can be expected as an extension of the existing recommendation methods.

Further, as an advantage of the extraction of recommended products, although information such as the product specification information 150 is additionally needed, unlike in the case of previous recommendation methods, the addition of the information makes it possible to catch a user's taste more finely than in the previous recommendation methods. For example, when a user thinks that a function is unnecessary, and is looking for products to which the function is not added, there's no other choice but to check the specifications of each product until now because it is difficult to make a search for products by using a key word "without oo function". The use of this recommendation device makes it possible to infer that a user has intensively checked products without oo function from the user's actions or indication of the user's intention, and therefore the user is enabled to efficiently find out products that the user is demanding, in response to the recommendation of products not equipped with oo function.

As previously explained, because the recommendation device of Embodiment 1 includes the product selecting unit for extracting a candidate for recommended product that is to be presented to a target user on the basis of browsing information indicating information about the user's browsing of a product, and unpurchased product information indicating information about a product that the user has indicated an intention to purchase; and the specification correlation calculating unit for extracting a product having a product specification correlated with a product specification of the candidate for recommended product, and extracting the extracted product as a recommended product, the accuracy of extraction of a recommended product can be improved.

Embodiment 2

Embodiment 2 relates to a configuration in which a user's next purchase tendency is predicted from owned product information that is history information about products owned by the user. Because the configuration in terms of drawings is the same as that of Embodiment 1 shown in FIG. 1, the configuration will be explained using FIG. 1.

A product selecting unit 110 in Embodiment 2 has a function of acquiring information about owned products of a target user on the basis of owned product information in an owned product information storing unit 14, in addition to the function of Embodiment 1. Further, a specification correlation calculating unit 111 is configured so as to, in addition to having the function of Embodiment 1, when extracting a recommended product that is a target for replacement of an owned product about which information is acquired by the product selecting unit 110, extract a product having a product specification correlated with a product specification to be maintained or improved, out of the product specifications of the owned product, and, when extracting a recommended product for compensating for lack of owned products, compare information about a product group which is stored in a product information storing unit 15 and the information about the owned products, and extract, as a lacking product, a product that is not included in the product group, and also determine a product specification of this lacking product from the product specifications of the owned products and extract a product matching the determined product specification. Further, in the product information storing unit 15, information about a product group, the information indicating a combination of products that is determined on the basis of a predetermined condition, is stored. Because a configuration other than this configuration is the same as that of Embodiment 1, an explanation will be omitted hereafter.

Next, the operation of a recommendation device of Embodiment 2 will be explained.

First, the product selecting unit 110, just as in conventional cases, notifies the specification correlation calculating unit 111 of information about products currently owned by a user, together with a message indicating that the products are owned, on the basis of owned product information in the owned product information storing unit 14, the owned product information indicating the user's history of previous purchases and the user's own products. When receiving the information about the owned products, the specification correlation calculating unit 111 performs processing for two patterns including replacement purchase and additional purchase which are shown below.

When Replacement of an Owned Product is Considered

A flowchart of the operation of the specification correlation calculating unit 111 when replacement of an owned product is considered is shown in FIG. 4.

When a user who considers purchasing a new product for the reason that the user's own product has become old or has been broken down is assumed, the specification correlation calculating unit 111 selects products that are candidates for replacement by performing the following processing. First, as to all the user's own products, it is determined whether or not the replacement of each of the products is desirable, from a purchase time and a time interval for replacement purchase of the corresponding product when the purchase time is known, or from a sales period and a time interval for replacement purchase of the corresponding product when the purchase time is unknown (step ST201). This determination is performed for each of the user's own products (step ST202). When the replacement is not desirable for an owned product that is a determination object (when NO in step ST202), the processing returns to step ST201 and the replacement determination is performed on the next owned product.

As to a product that has been determined, in step ST202, to be desirable to be replaced (YES in step ST202), it is then retrieved whether a specification of the product should be maintained or improved when the product is replaced, from the type of the product, together with the specification of the product, from the product information in the product information storing unit 15 (steps ST203 and ST204). For example, in general, the "size" in the specifications of furniture or a household electrical appliance should be maintained, and an improvement in another specification such as performance or capability is demanded when the product is replaced. When a specification should be maintained or improved (YES in step ST204), the specification is added as a maintenance or improvement condition (step ST205). In contrast, when a specification should not be maintained or improved (NO in step ST204), the specification, as a specification condition, is not added to conditions for candidate selection. The addition of a specification that should be maintained may be indispensable, and the addition of a specification that should be improved may be free. Next, the specification correlation calculating unit 111 whether or not all the specifications have been processed (step ST206), and, when a specification on which the determination should be performed still remains (NO in step ST206), the processing returns to step ST203 and the processes of steps ST203 to ST205 are repeated.

When the determination has been performed on all the specifications in step ST206 (YES in step ST206), the specification correlation calculating unit 111 extracts products under the conditions for candidate selection (step ST207). More specifically, products that are recommended to be used for replacement and each of which satisfies either a condition to be maintained or a condition to be improved are selected from the product information. After that, whether or not all the products have been processed is determined (step ST208), and, when a yet-to-be-processed product remains (NO in step ST208), the processing returns to the step ST201 and the above-mentioned processes are repeated, whereas when it is determined that all the products have been processed (YES in step ST208), the product replacement determination processing is ended.

In the determination of whether or not the replacement is desirable, out of the above-mentioned processes, an inference that a malfunction may have occurred in a product may be used, on the basis of information as the user's browsing information in a browsing information storing unit 12, the information indicating that the user has referred to information about troubleshooting for the product, or the like. Further, information indicating that another user has replaced the same product by a new product may be used. In addition, the selection of products each satisfying a condition may be performed by the product selecting unit 110 after the conditions for candidate selection are sent to the product selecting unit 110.

When Compensation for Lack of the Owned Products is Considered

A flowchart of the operation of the specification correlation calculating unit 111 when compensation for lack of the owned products is considered is shown in FIG. 5.

Irrespective of whether or not a user satisfies, the specification correlation calculating unit 111 selects, as a product that is a candidate for additional purchase, a product lacking in the owned products of the user. In this case, it is assumed that information about a group of combined products is registered in advance as product information in the product information storing unit 15. For example, in the case of household electrical appliances, it is assumed that a refrigerator, a washing machine, a cleaner, a television, and so on are registered as a group. By using this product information, the specification correlation calculating unit 111 first compares the user's own products and the product group (step ST301). When it is determined, as a result of the comparison, that there are lacking products, i.e., products that the user has not owned or purchased (YES in step ST302), out of the lacking products, as to a product for which the user has not indicated unnecessity, a condition for a product that is inferred to be appropriate to be additionally purchased from the specifications of the user's own products included in the group is determined (step ST303). For example, when the user has purchased a refrigerator, a washing machine, and a cleaner made by AA Electric Corporation, a television made by AA Electric Corporation are determined as a condition. Next, on the basis of the derived conditions, the specification correlation calculating unit 111 extracts products satisfying the conditions, from the product information stored in the product information storing unit 15, just as in the case of replacement (step ST304). Then, whether or not the comparison has been performed on all the owned products is determined (step ST305), and the processing is ended when the determination has been performed on all the owned products (YES in step ST305). In contrast, when an owned product as an object for comparison remains in step ST305 (NO in step ST305), the processing returns to step ST301 and the above-mentioned processes are repeated. Further, when there is no lacking product in step ST302, the processing is just ended.

In this way, in this embodiment, by adding the process using the correlation degrees in product specifications, to the conventional process of extracting recommended products while setting them as targets for replacement purchase or additional purchase, it is possible to more correctly select products that the user is demanding, as an extension of the existing systems. Concretely, recommendations to the user's purchases over a long period of time, for example, are provided in consideration of the user's environment (residential space, family structure, economic conditions, etc.), a conventional recommendation method being weak in providing such recommendations, so that a product that is purchased as a replacement or additionally purchased has specifications (size, specifications, price, etc.) matching the environment.

As previously explained, in the recommendation device of Embodiment 2, because the product selecting unit acquires information about one or more owned products of a target user on the basis of owned product information indicating information about the products owned by the user, and when extracting a recommended product that is a target for replacement of an owned product of the target user, the specification correlation calculating unit extracts a product having a product specification correlated with a product specification to be maintained, out of product specifications of the owned product, the accuracy of extraction of a recommended product at a time of replacement purchase can be improved.

Further, in the recommendation device of Embodiment 2, because the specification correlation calculating unit extracts a product having a product specification correlated with a product specification to be improved, out of the product specifications of the owned product, a recommended product corresponding to a product that a user is demanding can be extracted with a higher degree of accuracy.

Further, in the recommendation device of Embodiment 2, because the product selecting unit acquires information about one or more owned products of the target user on the basis of owned product information indicating information about the products owned by the user, and when extracting a recommended product for compensating for lack of the owned products of the target user, the specification correlation calculating unit compares a product group indicating a combination of products and the owned products and extracts, as a lacking product, a product that is not included in the product group, and also determines a product specification of the lacking product from product specifications of the owned products and extracts a product matching the product specification, the accuracy of extraction of a recommended product at a time of additional purchase can be improved.

Further, in the recommendation device of Embodiment 2, because the product selecting unit acquires information about one or more owned products that the target user has purchased on the basis of owned product information indicating information about the products owned by the user, and when extracting a recommended product that is a target for replacement of an owned product of the target user, the specification correlation calculating unit extracts a product having a product specification correlated with a product specification to be maintained, out of product specifications of the owned product, and when extracting a recommended product for compensating for lack of the owned products of the target user, the specification correlation calculating unit compares a product group indicating a combination of products and the owned products and extracts a lacking product, and also determines a product specification of the lacking product from product specifications of the owned products and extracts a product matching the product specification, the accuracy of extraction of a recommended product at a time of replacement purchase and at a time of additional purchase can be improved.

It is to be understood that any combination of the above-mentioned embodiments can be made, various changes can be made in any component according to any one of the above-mentioned embodiments, and any component according to any one of the above-mentioned embodiments can be omitted within the scope of the present disclosure.

INDUSTRIAL APPLICABILITY

As mentioned above, the recommendation device according to the present disclosure relates to a configuration in which a recommendation device is extracted on the basis of browsing information and unpurchased product information about users, and product specifications, and is suitable for providing product advertisements for users in online shopping.

REFERENCE SIGNS LIST 1 recommendation delivery device, 2 network, 3-1 to 3-*n* user terminal, 10 recommendation information delivery server, 11 recommendation device, 12 browsing information storing unit, 13 unpurchased product information storing unit, 14 owned product information storing unit, 15 product information storing unit, 110 product selecting unit, 111 specification correlation calculating unit, and 150 product specification information.

The invention claimed is:

1. An apparatus comprising at least one processor and at least one memory including computer program code, the at least one memory and the computer program code configured to, with the at least one processor, cause the apparatus to:
receive browsing information associated with a first user, wherein the browsing information comprises information indicating that the first user has referred to information associated with troubleshooting a malfunction associated with a first product;
responsive to receiving the browsing information, store the browsing information in a browsing information storing unit;
determine that the first product is affected by the malfunction based at least on the browsing information, wherein the browsing information is received from one or more third-party services;
determine a plurality of candidates for a first recommended product for the first user based at least on the determination that the first product is affected by the malfunction;
determining a first recommended product from the plurality of candidates; and
cause the first recommended product to be presented to the first user, wherein causing the first recommended product to be presented to the first user comprises:
transmitting, via a network, a renderable message indicative of the first recommended product to a first user terminal associated with the first user.

2. The apparatus of claim 1, wherein the first recommended product is a replacement for the first product affected by the malfunction.

3. The apparatus of claim 1, wherein the determination of the first recommended product for the first user is further based at least on information indicating that a second user has replaced a second product with a second recommended product.

4. The apparatus of claim 3, wherein the second product is identical to the first product and the second recommended product is identical to the first recommended product.

5. The apparatus of claim 1, wherein the at least one memory and the computer program code are further configured to, with the at least one processor, cause the apparatus to:
capture the browsing information via a user interface of a user device associated with the first user.

6. The apparatus of claim 1, wherein the at least one memory and the computer program code are further configured to, with the at least one processor, cause the apparatus to:
determine a product group type associated with the first recommended product;
determine a third recommended product for the first user based at least on the product group type associated with the first recommended product; and
cause the third recommended product to be presented to the first user.

7. The apparatus of claim 1, wherein the determination of the plurality of candidates is based at least on historical browsing information associated with the first user.

8. The apparatus of claim 7, wherein the determination of the plurality of candidates is further based at least on historical browsing information associated with at least one other user.

9. The apparatus of claim 1, wherein the at least one memory and the computer program code are further configured to, with the at least one processor, cause the apparatus to:
determine a plurality of categories associated with each candidate of the plurality of candidates; and
select at least one category to define a condition for candidate selection, wherein determination of the first recommended product is further based at least on the at least one category.

10. The apparatus of claim 1, wherein the at least one memory and the computer program code are further configured to, with the at least one processor, cause the apparatus to:
retrieve, using a recommendation device, the browsing information from the browsing information storing unit.

11. The apparatus of claim 10, wherein the browsing information storing unit is a first device of a recommendation delivery device and the recommendation device is a second device of the recommendation delivery device.

12. The apparatus of claim 1, wherein the renderable message is configured to be displayed on a portion of a screen of the user terminal.

13. The apparatus of claim 1, wherein to determine the first recommended product from the plurality of candidates comprises the at least one memory and the computer program code being further configured to, with the at least one processor, cause the apparatus to:
determine a degree of correlation between a first product specification of the first product and a second product specification of the first recommended product; and
determine that the degree of correlation exceeds a predetermined threshold, wherein the first recommended product is caused to be recommend to the first user in response to determining that the degree of correlation exceeds a predetermined threshold.

14. A method comprising:
receiving browsing information associated with a first user, wherein the browsing information comprises information indicating that the first user has referred to information associated with troubleshooting a malfunction associated with a first product;
responsive to receiving the browsing information, storing the browsing information in a browsing information storing unit;
determining that the first product is affected by the malfunction based at least on the browsing information, wherein the browsing information is received from one or more third-party services;
determining a plurality of candidates for a first recommended product for the first user based at least on the determination that the first product is affected by the malfunction;
determining a first recommended product from the plurality of candidates; and
causing the first recommended product to be presented to the first user, wherein causing the first recommended product to be presented to the first user comprises:
transmitting, via a network, a renderable message indicative of the first recommended product to a first user terminal associated with the first user.

15. The method of claim 14, wherein the first recommended product is a replacement for the first product affected by the malfunction.

16. The method of claim 14, wherein the determination of the first recommended product for the first user is further based at least on information indicating that a second user has replaced a second product with a second recommended product.

17. The method of claim 16, wherein the second product is affected by the malfunction.

18. The method of claim 14, further comprising:
capturing the browsing information via a user interface of a user device associated with the first user.

19. The method of claim 14, further comprising:
determining a product group type associated with the first recommended product;
determining a third recommended product for the first user based at least on the product group type associated with the first recommended product; and
causing the third recommended product to be presented to the first user.

20. At least one non-transitory computer-readable storage medium having computer-executable program code portions stored therein, the computer-executable program code portions comprising program code instructions configured to:
receive browsing information associated with a first user, wherein the browsing information comprises information indicating that the first user has referred to information associated with troubleshooting a malfunction associated with a first product;
responsive to receiving the browsing information, store the browsing information in a browsing information storing unit;
determine that the first product is affected by the malfunction based at least on the browsing information, wherein the browsing information is received from one or more third-party services;
determine a plurality of candidates for a first recommended product for the first user based at least on the determination that the first product is affected by the malfunction;

determining a first recommended product from the plurality of candidates; and cause the first recommended product to be presented to the first user, wherein causing the first recommended product to be presented to the first user comprises:
transmitting, via a network, a renderable message indicative of the first recommended product to a first user terminal associated with the first user.

* * * * *